United States Patent [19]

Cardone et al.

[11] Patent Number: 4,507,635

[45] Date of Patent: Mar. 26, 1985

[54] MAGNETIC ANCHORING APPARATUS WITH QUADRANGULAR POLE ARRANGEMENT

[75] Inventors: Michele Cardone; Angelo Grandini; Bruno Zaramella, all of Milan, Italy

[73] Assignee: Tecnomagnetica di Cardone, Grandini, Zaramella & C.S.a.s., Italy

[21] Appl. No.: 551,793

[22] Filed: Nov. 15, 1983

[30] Foreign Application Priority Data

Nov. 16, 1982 [IT] Italy ............................. 23483/82[U]

[51] Int. Cl.³ ............................................... H01F 7/20
[52] U.S. Cl. ...................................... 335/291; 335/295
[58] Field of Search ............... 335/285, 289, 290, 291, 335/294, 295, 306

[56] References Cited

U.S. PATENT DOCUMENTS

| 3,316,514 | 4/1967 | Radus et al. | 335/291 |
| 4,075,589 | 2/1978 | Braillon | 335/289 X |
| 4,090,162 | 5/1978 | Cardone et al. | 335/291 X |
| 4,250,478 | 2/1981 | Cardone et al. | 335/288 |

*Primary Examiner*—George Harris
*Attorney, Agent, or Firm*—Beveridge, De Grandi & Kline

[57] ABSTRACT

A magnetic anchoring apparatus, comprising in combination: an external ferromagnetic crown provided with a base plate and lateral walls; at least one group of four pole pieces defining pairs of corresponding poles of an anchoring surface, said pole pieces presenting their longitudinal axes at right angles to the base plate and in correspondence with the apexes of a square. The apparatus comprising moreover a plurality of permanent magnets for feeding the aforesaid poles, interposed between the pole pieces and, respectively, between the latter and said ferromagnetic crown.

9 Claims, 5 Drawing Figures

MAGNETIC ANCHORING APPARATUS WITH QUADRANGULAR POLE ARRANGEMENT

BACKGROUND OF THE INVENTION

This invention concerns a magnetic apparatus for anchoring ferromagnetic parts suitable in particular, but not exclusively, for use in large permanent magnet power-lifts, of the type in which the magnetic activation and deactivation of the apparatus is achieved by reversing the polarity of a group of magnets by means of electric inductors or coils which surround the magnets themselves, and which are fed with pulses of current in one direction and, respectively, in the opposite direction to the first. In all cases of magnetic anchorage of ferrous loads having a deformed and/or rough contact surface, it is essential to be able to make use of magnetic apparatuses with a work or anchoring surface which is as limited as possible, in its external development, and of isometric configuration, while maintaining a high power or magnetic performance of the apparatus itself; this is particularly important, for example, in the field of large power-lifts for very large and heavy parts, where permanent-magnet lifting units have not until now been able to offer the required power and a high degree of operational reliability.

The concept of limiting the external development of the apparatus has been included in a number of German regulations, especially for large circular power-lifts of the electromagnetic type; according to this regulation, the theoretical magnetic power of the apparatus—in order to ensure the utmost operational reliability—should be declassed in direct proportion to the width and length of the magnetic work surface of the power-lift, that is, to the external development of the apparatus itself. In other words, it is important to make the peripheral conformation of the apparatus isometric (central symmetry) in order to enable the apparatus to operate uniformly, that is to say, without having to resort to obliged positioning of the latter with respect to the load to be lifted or to the parts to be anchored.

In magnetic power-lifts, it is also important that the theoretical power of the apparatus is absorbed as far as possible by the load, or by the parts to be lifted and that it is not diverted along flux paths which do not affect the part or parts to be anchored. In other words, it is essential that the maximum of induction or the maximum of flux provided by the apparatus is short-circuited by the minimum thickness of ferromagnetic material in order to ensure satisfactory anchorage under the most varied working conditions. It is also important, with the same power actually provided, that the weight and the cost of the apparatus are as low as possible. Magnetic anchoring apparatuses of the permanent magnet type are generally known, also by previous patents of the applicant, in which the activation and deactivation of the apparatus occurs by reversing the polarity of some of the magnets which make up its circuit. However, in such apparatuses of the known type, due either to the particular conformation of the magnetic circuit, or to the disposition and distribution of the masses of magnetic material itself, and to other structural and design characteristics, it is not possible to achieve a symmetrical conformation of the apparatus, according to the above-mentioned principles, without loss of a considerable reduction in the power provided by the apparatus, resulting in limitations in its use.

A scope of this invention is to provide a magnetic anchoring apparatus, of the type previously mentioned, which is capable of satisfying the specified requirements, and in particular an apparatus of such a kind, in relation to other conventionally constructed equipment, having equal theoretical power, as to enable total short-circuiting of the available magnetic flux, in the least possible thickness of the load or of the ferromagnetic parts to be anchored.

A further scope of the invention is to provide an apparatus as mentioned above, in which the area of its magnetic or anchoring surface is substantially symmetric with respect to a central axis of the apparatus itself (principle of isometry), which has pole pieces with very limited volumes and, therefore, weights and in which the leakage flux is drastically reduced or almost eliminated.

SUMMARY OF THE INVENTION

According to the invention, a magnetic anchoring apparatus is provided, comprising in combination: an external ferromagnetic crown having a base plate and lateral walls; at least one group of four pole pieces defining pairs of corresponding poles of an anchoring surface, said pole pieces having their longitudinal axes arranged at right angles to the base plate and in correspondence with the apexes of a square; the apparatus further comprising a plurality of permanent magnets for feeding the aforesaid pole pieces arranged between said pole pieces and, respectively, between the latter and the ferromagnetic crown, the magnets relative to each pole piece being arranged in such a way as to have a main magnet, axially aligned with the pole piece, which provides a first magnetic flux value, as well as laterally arranged secondary magnets which surround said pole piece, whose magnetization axes are arranged perpendicular to the axis of the pole piece itself, said secondary magnets together providing a magnetic flux substantially equivalent to the flux of said main magnet.

The magnetic conductors or pole pieces mentioned above define the N and S poles of the working surface of the apparatus, and are therefore arranged symmetrically with respect to the center of said surface or longitudinal axis of the apparatus, in other words, they are arranged parallel to the longitudinal axes of the pole pieces, with the pairs of poles of the same name or having identical N or S polarity, which lie on the same diagonal of an ideal square for arrangement of the poles (principle of isometry). The pole pieces may present a cross-section of any shape whatsoever, provided it enables the magnets to be arranged at right angles, both with respect to the pole piece itself and to the magnetic crown; for example, the pole pieces may present a square, triangular or circular cross-section, however, the square shape of the pole pieces proves to be the most preferred shape, in that it enables a better dimensioning of the magnetic circuit and a better distribution of the magnetic flux in the circuit itself. Said square shape makes it possible moreover to achieve a four pole basic circuit which may be repeated indefinitely, by subsequently arranging pairs of pole pieces, together with the relative magnets, along one or both of the right-angle directions of the axes of the ideal square for arrangement of the poles, thereby obtaining ample anchoring areas in which the single basic circuits always retain their isometric conformation.

BRIEF DESCRIPTION OF THE DRAWINGS

The invention, by way of example, will be illustrated in greater detail hereunder, with reference to the figures in the accompanying drawings, in which.

DESCRIPTION OF THE INVENTION

Figure 1:
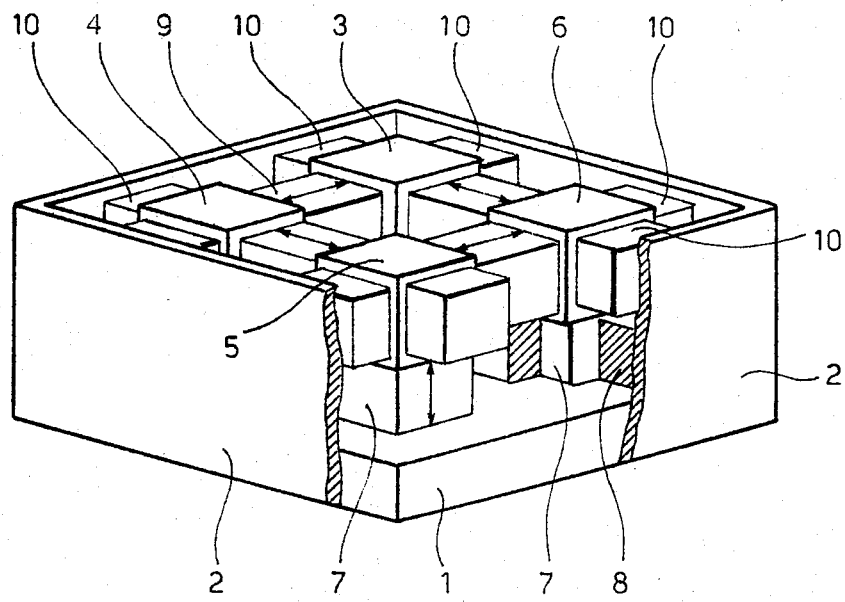
FIG. 1 shows a partially cross-sectioned perspective view of an apparatus according to the invention, consisting of a basic circuit comprising four square poles.

In FIG. 1, the apparatus is shown with its magnetic surface or area for anchoring ferromagnetic parts facing upwards, however this arrangement may be overturned in the case of such apparatus being used as a lifting apparatus. The apparatus comprises an outer structure made of ferromagnetic material, defining a magnetic crown which surrounds and protects the entire apparatus on five sides; this magnetic crown substantially comprises a base plate 1 of given thickness, and lateral walls 2 of lesser thickness, for the reasons explained further on, suitably fixed, for example by means of bolts or the like, not shown, to the base plate 1.

Figure 2:
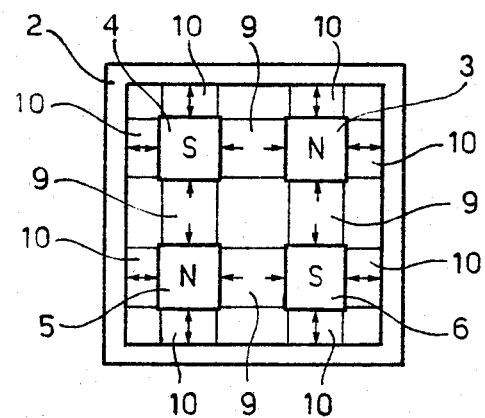
FIG. 2 shows a plan view of the apparatus of FIG. 1.

The plate 1 and the walls 2 constitute part of a four-pole basic magnetic circuit comprising four square-shaped magnetic conductors or pole pieces 3, 4, 5 and 6, whose longitudinal axes are arranged at right angles to the base plate 1, and according to the apexes of an ideal square, as shown by the plan view in FIG. 2. Each of the pole pieces 3, 4, 5 and 6 is connected to the base plate 1 by means of a permanent magnet 7, hereinafter referred to as main magnet, whose axis of magnetization is coaxial to and aligned with the longitudinal axis of the respective pole piece. Each main magnet 7 is made of permanent magnetic material having such dimensions as to provide a first pre-established flux value, and is surrounded by an induction coil 8 which is fed, in a per sè known way, with current pulses in one direction or in the opposite direction in order to reverse the polarity of the main magnets whenever the apparatus must be activated and, respectively, deactivated.

The pole pieces 3, 4, 5 and 6 are also magnetically connected together by means of a plurality of secondary permanent magnets interposed both between the pole pieces themselves, on the sides of the quadrangular pole arrangement, as shown by reference 9, and also between the pole pieces and the lateral walls 2 of the magnetic crown, as shown by reference 10 in the figures, so as to completely or almost cover the pole pieces. From the figures it can be seen moreover that the axes of the secondary magnets are at right angles to the axis of the respective pole pieces and, in the specific case shown, in which the pole pieces are delimited by flat lateral surfaces placed at 90° to each other, the axes of the secondary magnets are respectively all at right angles to the aforesaid surfaces. As the magnets of each pole piece, with the apparatus in the activated condition, are all orientated with the same N or S polarity facing towards the same pole piece (FIG. 2), the anchoring surface of the apparatus consequently presents a quadrangular arrangement of the N and S magnetic poles in which pairs of poles of the same name are arranged according to a diagonal of the previously mentioned square, thus obtaining an isometric arrangement of the poles with respect to the central axis of the apparatus or of the basic magnetic circuit thus achieved. In the activated condition of the apparatus, all the magnets of each pole piece 3, 4, 5 and 6 feed the same pole and the flux closes within the pieces to be anchored, however in the deactivated condition, obtained by a polar reversal of the main magnets, the magnetic flux closes within the circuit itself, without affecting the anchoring surface. Therefore the secondary magnets of each pole piece, must be such as to provide, all together, a secondary magnetic flux of a value substantially equal to the flux provided by the main magnet 7; in particular, each secondary magnet will provide a portion of the secondary flux which is proportional to the portion of perimeter of the pole piece covered by the magnet itself.

The arrangement of the poles and the magnets, according to the above description and according to the square conformation or arrangement of the poles, as in the illustrated example, makes it possible to achieve an even distribution of the fluxes in the magnetic circuit and, consequently, a substantial reduction in the working sections of the pole pieces, the base plate 1 and the walls 2 of the external magnetic crown. In the example of the square poles in question, in which each secondary magnet provides a flux equal to one quarter of the flux provided by the main magnet, the base plate consequently has a working cross-sectional area for passage of the flux smaller or substantially equal to one half of that which a two-pole apparatus with the same theoretical power would have; likewise, the lateral walls 2 of the crown will have a working cross-sectional area for passage of the flux, substantially one half that of the base plate 1. Thus achieving an apparatus which, with an identical working area of the magnetic anchoring surface, presents, with respect to the known apparatuses, a considerably smaller volume and consequently a considerably lower weight in all its magnetically conductive parts. Lastly, the substantial absence of leakage fluxes and the distribution of the flux in the part to be anchored peripherally around each pole makes it possible to utilize the maximum anchoring or lifting power of the apparatus, even with ferromagnetic parts of considerable weight, but with relatively limited sections.

Figure 3:
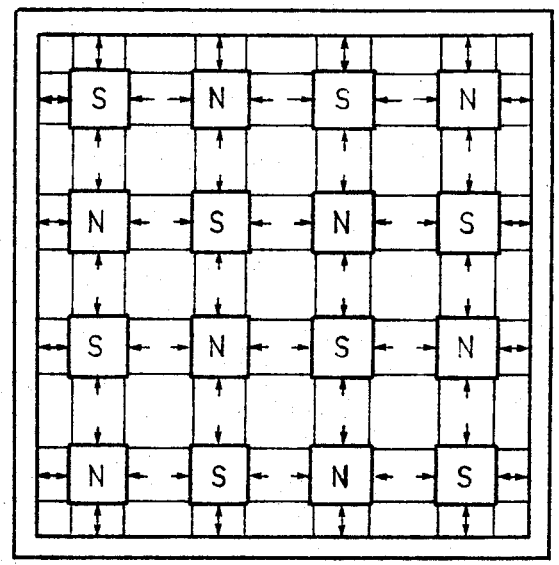
FIG. 3 shows the possibility of indefinite repetition of the basic circuit according to the apparatus of the previous figures.
Figure 4:
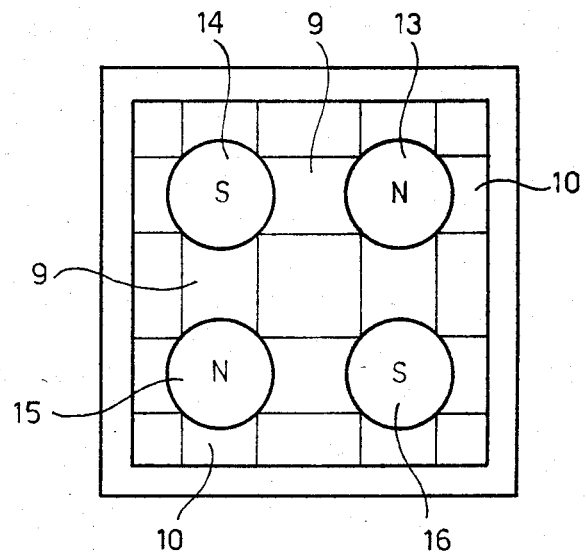
FIGS. 4 and 5 refer to further embodiments.
Figure 5:
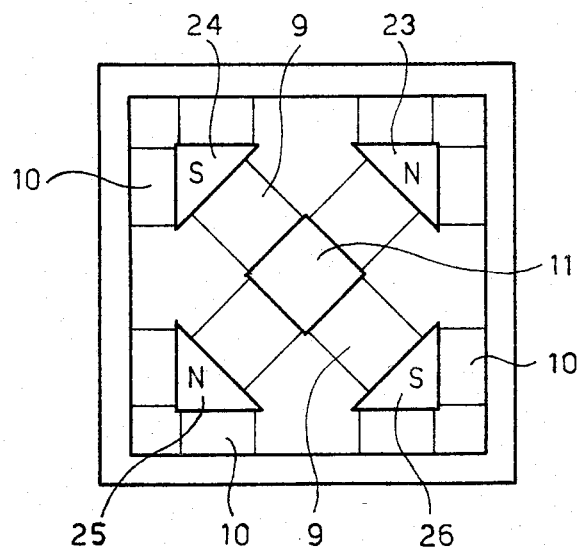

The layout of the magnetic circuit in FIGS. 1 and 2 is also advantageous in that it enables its practically unlimited multiplication, in one or both the orthogonal directions along the axes of the quadrangular arrangements of the poles or along straight lines parallel to the latter; this can be achieved, as shown schematically in FIG. 3, by arranging in succession, in the same direction and/or in parallel directions, pairs of pole pieces with opposing N and S polarity with the relative feeding magnets. The plan view in FIG. 3 proves that the characteristic symmetrical arrangement of the magnetic poles does not change, for each basic magnetic circuits, as poles of the same name are arranged along the diagonals and along lines parallel to the latter. FIGS. 4 and 5 refer to different solutions of the main quadrangular disposition of pole pieces according to the invention; more particularly, FIG. 4 shows the disposition of cylindrical pole pieces 13, 14, 15, 16 and permanent magnets 9, 10, whereas FIG. 5 shows the disposition of triangular pole pieces 23, 24, 25, 26, permanent magnets 9, 10 and a square-shaped inside neutral piece or core 11; obviously, different dispositions are possible in this latter case.

It is therefore understood that what has been described and shown with reference to the accompanying drawings, has been given merely in order to illustrate this invention and that other equivalent solutions are possible with regard to the shape of the pole pieces and the arrangement of the permanent magnets, without deviating from what is claimed.

What is claimed is:

1. Magnetic anchoring apparatus, comprising in combination: an external ferromagnetic crown provided with a base plate and lateral walls; at least one group of four pole pieces defining pairs of corresponding poles of an anchoring surface, said pole pieces presenting their longitudinal axes arranged at right angles to the base plate and in correspondence with the apexes of a square; the apparatus comprises moreover a plurality of permanent magnets for feeding the aforesaid poles, interposed between the pole pieces and, respectively, between the latter and the ferromagnetic crown, the arrangement of the magnets, for each pole piece, being such as to have a main magnet, axially aligned with the pole piece, which provides a first magnetic flux value, as well as laterally arranged secondary magnets which surround the pole piece, and whose axes of magnetization are arranged perpendicular to the axis of the pole piece itself, said secondary magnets together providing a magnetic flux substantially equal to the flux of the main magnet.

2. Apparatus as claimed in claim 1, in which each secondary magnet, whose axis is at right angles to that of the respective pole piece, provides a portion of secondary flux which is proportional to the portion of perimeter of the pole piece covered by the magnet itself.

3. Apparatus as claimed in claim 1, in which the pole pieces are delimited by cylindrical or flat lateral surfaces defining circular, triangular or quadrangular-shaped cross-sections of the pole pieces.

4. Apparatus as claimed claim 1, in which the pole pieces present a square-shaped cross-section and in which each of the secondary magnets provides a magnetic flux of a value substantially equal to one quarter of the flux of the main magnet.

5. Magnetic anchoring apparatus, comprising a plurality of basic magnetic circuits as claimed in claim 1, in which pairs of pole pieces, together with the relative feeding magnets, are subsequently arranged in at least one of the directions of the orthogonal axes of a main quadrangular pole arrangement in said basic circuit, or in directions parallel to the latter, or both with the poles of the same polarity aligned according to lines coinciding with, or parallel to, the diagonals of said main quadrangular arrangements.

6. Apparatus as claimed in claim 5, in which each main magnet is surrounded by an induction winding, for reversing the polarization of said magnet.

7. Apparatus as claimed in claim 2, in which the pole pieces present a square-shaped cross-section and in which each of the secondary magnets provides a magnetic flux of a value substantially equal to one quarter of the flux of the main magnet.

8. Apparatus as claimed in claim 3, in which the pole pieces present a square-shaped cross-section and in which each of the secondary magnets provides a magnetic flux of a value substantially equal to one quarter of the flux of the main magnet.

9. Apparatus as claimed in claim 1, in which each main magnet is surrounded by an induction winding, for reversing the polarization of said magnet.

* * * * *